(12) United States Patent　　(10) Patent No.: US 7,902,769 B2
Shteynberg et al.　　(45) Date of Patent: Mar. 8, 2011

(54) CURRENT REGULATOR FOR MODULATING BRIGHTNESS LEVELS OF SOLID STATE LIGHTING

(75) Inventors: Anatoly Shteynberg, San Jose, CA (US); Harry Rodriguez, Gilroy, CA (US)

(73) Assignee: Exclara, Inc., Santa Clara, CA (US)

( * ) Notice: Subject to any disclaimer, the term of this patent is extended or adjusted under 35 U.S.C. 154(b) by 992 days.

(21) Appl. No.: 11/655,308

(22) Filed: Jan. 19, 2007

(65) Prior Publication Data

US 2007/0182338 A1　　Aug. 9, 2007

Related U.S. Application Data

(60) Provisional application No. 60/760,157, filed on Jan. 20, 2006.

(51) Int. Cl.
*G05F 1/00* (2006.01)
(52) U.S. Cl. .......................... 315/291; 315/308
(58) Field of Classification Search .............. 315/200 R, 315/209 R, 291, 307, 312
See application file for complete search history.

(56) References Cited

U.S. PATENT DOCUMENTS

| | | | | |
|---|---|---|---|---|
| 6,011,357 A * | 1/2000 | Gradzki et al. | ................ | 315/224 |
| 6,175,195 B1 * | 1/2001 | Janczak et al. | ................ | 315/194 |
| 6,577,512 B2 * | 6/2003 | Tripathi et al. | ............ | 363/21.17 |
| 6,597,127 B2 * | 7/2003 | Takahashi et al. | ............. | 315/224 |
| 6,628,089 B2 * | 9/2003 | Suomi | ............................. | 315/194 |
| 6,809,498 B2 * | 10/2004 | Nakamura et al. | ............. | 320/108 |
| 6,870,327 B2 * | 3/2005 | Takahashi et al. | ............. | 315/248 |
| 6,977,472 B2 * | 12/2005 | Matsubayashi et al. | ...... | 315/291 |

* cited by examiner

*Primary Examiner* — Douglas W Owens
*Assistant Examiner* — Minh D A
(74) *Attorney, Agent, or Firm* — Nancy R. Gamburd; Gamburd Law Group LLC

(57) ABSTRACT

An exemplary embodiment provides a current regulator for controlling variable brightness levels for solid state lighting. The current regulator is couplable to a phase-modulating switch, such as a dimmer switch, which is coupled to an AC line voltage. An exemplary current regulator includes a rectifier; a switching power supply providing a first current; an impedance matching circuit; and a controller. The impedance matching circuit is adapted to provide a second current through the phase-modulating switch when a magnitude of the first current is below a first predetermined threshold, such as a holding current of a triac of the phase-modulating switch. The controller is adapted to determine a root-mean-square (RMS) voltage level provided by the phase-modulating switch from the AC line voltage and to determine a duty cycle for pulse-width current modulation by the switching power supply in response to the comparison of the RMS voltage level to a nominal voltage level.

79 Claims, 7 Drawing Sheets

US 7,902,769 B2

CURRENT REGULATOR FOR MODULATING BRIGHTNESS LEVELS OF SOLID STATE LIGHTING

CROSS-REFERENCE TO A RELATED APPLICATION

This application claims priority to and is a conversion of U.S. Provisional Patent Application Ser. No. 60/760,157, filed Jan. 20, 2006, inventors Anatoly Shteynberg et al., entitled "Off-Line LED Driver with Phase Modulation", which is commonly assigned herewith, the contents of which are incorporated herein by reference, and with priority claimed for all commonly disclosed subject matter.

FIELD OF THE INVENTION

The present invention in general is related to power conversion, and more specifically, to a system, apparatus and method for supplying power to solid state lighting devices, such as for providing power to light emitting diodes ("LEDs") and LEDs integrated with digital controllers or processors.

BACKGROUND OF THE INVENTION

A wide variety of off-line LED drivers are known. For example, a capacitive drop off-line LED driver from On Semiconductor (Application Note AND8146/D) is a non-isolated driver with low efficiency, is limited to deliver relatively low power, and at most can deliver a constant current to the LED with no temperature compensation, no dimming arrangements, and no voltage or current protection for the LED.

Isolated off-line LED drivers also have wide-ranging components and/or characteristics, such as a line frequency transformer and current regulator (On Semiconductor Application Note AND 8137/D); a current mode controller (On Semiconductor Application Note AND8136/D: a white LED luminary light control system (U.S. Pat. No. 6,441,558); LED driving circuitry with light intensity feedback to control output light intensity of an LED (U.S. Pat. No. 6,153,985); a non-linear light-emitting load current control (U.S. Pat. No. 6,400,102); a flyback as an LED Driver (U.S. Pat. No. 6,304,464); a power supply for an LED (U.S. Pat. No. 6,557,512); a voltage booster for enabling the power factor controller of a LED lamp upon a low AC or DC supply (U.S. Pat. No. 6,091,614); and an inductor based boost converter (e.g., LT 1932 from Linear Technology or NTC5006 from On—Semiconductor).

In general, these various LED drivers are overly complicated, such as using secondary side signals (feedback loops) which have to be coupled with the controller primary side, across the isolation provided by one or more transformers. Many utilize a current mode regulator with a ramp compensation of a pulse width modulation ("PWM") circuit. Such current mode regulators require relatively many functional circuits while nonetheless continuing to exhibit stability problems when used in the continuous current mode with a duty cycle (or duty ratio) over fifty percent. Various prior art attempts to solve these problems utilized a constant off time boost converter or hysteric pulse train booster. While these prior art solutions addressed problems of instability, these hysteretic pulse train converters exhibit other difficulties, such as electromagnetic interference, inability to meet other electromagnetic compatibility requirements, and are comparatively inefficient. Other approaches, such as in U.S. Pat. No. 6,515,434 B1 and U.S. Pat. No. 747,420, provide solutions outside the original power converter stages, adding additional feedback and other circuits, which render the LED driver even larger and more complicated.

Many of these power supplies (i.e., drivers) are effectively incompatible with the existing lighting system infrastructure, such as the lighting systems typically utilized for incandescent or fluorescent lighting. These power supplies, generally implemented as a form of switching power supplies, are particularly incompatible with phase-modulating "dimmer" switches utilized to alter the brightness or intensity of light output from incandescent bulbs. Incandescent lamps primarily utilize phase modulation for dimming brightness or intensity, through triac switches, to control the power sent to the bulb. Accordingly, replacement of incandescent lamps by LEDs is facing a challenge: either do a complete rewiring of the lighting infrastructure, which is expensive and unlikely to occur, or develop new LED drivers compatible with phase modulation of the input AC voltage by commercially available and already installed dimmers switches. In addition, as many incandescent lamps will likely remain in any given lighting environment, it would be highly desirable to enable LEDs and incandescent lamps to operate in parallel and under common control.

One prior art approach to this problem is found in Elliot, US Patent Application Publication No. 2005/0168168, entitled "Light Dimmer for LED and Incandescent lamps", in which incandescent lamps and LEDs are connected to a common lamp power bus, with the light output intensity controlled using a composite waveform, having two power components. This proposal is complicated, requires excessively many components to implement, and is not particularly oriented to AC utility lighting.

Another prior art approach is described in Mednik et al., U.S. Pat. No. 6,781,351, entitled "AC/DC Cascaded Power Converters having High DC Conversion Ratio and Improved AC Line Harmonics", and in publication Alex Mednik "Switch Mode Technique in Driving HB LEDs", Proceedings of the Conference Light Emitting Diodes, 2005, which disclose an off-line LED driver with a power factor correction capability. When coupled with a dimmer, however, its LED regulation is poor and it does not completely support stable operation of the dimmer in the full range of output loads, specifically when both incandescent and LED lamps are being used in parallel.

FIG. 1 is a circuit diagram of a prior art current regulator 50 connected to a dimmer switch 75 which provides phase modulation. FIG. 2 is a circuit diagram of such a prior art dimmer switch 75. The time constant of resistor 76 (R1) and capacitor 77 (C1) control the firing angle "α" of the triac 80 (illustrated in FIG. 4). The diac 85 is used to maximize symmetry between the firing angle for the positive and negative half cycles of the input AC line voltage (35). Capacitor 45 (C2) and inductor 40 (L1) form a low pass filter to help reduce noise, generated by the dimmer switch 75. A triac 80 is a switching device effectively equivalent to reverse parallel Silicon Controlled Rectifiers (SCR), sharing a common gate. The single SCR is a gate controlled semiconductor that behaves like a diode when turned on. The gate (70) signal is used to turn the device on and the load current is used to hold the device on. Thus, the gate signal cannot turn the SCR off and will remain on until the load current goes to zero. A triac behaves like a SCR but conducts in both directions. Triacs are well known to have different turn on thresholds for positive and negative conduction. This difference is usually minimized by using a diac 85 coupled to the triac gate 70 to control the turn on voltage of the triac 80.

Triacs 80 also have minimum latching and holding currents. The latching current is the minimum current required to turn on the triac 80 when given a sufficient gate pulse. The holding current is the minimum current required to hold the triac 80 in an on state once conducting. When the current drops below this holding current, the triac 80 will turn off. The latching current is typically higher than the holding current. For dimmer switches that use triacs, capable of switching 3 to 8 A, the holding and latching currents are on the order of 10 mA to about 70 mA.

The firing angle ($\alpha$) of the triac 80 controls the delay from the zero crossing of the AC line, and is limited between 0° and 180°, with 0° equating to full power and 180° to no power delivered to the load, with an exemplary phase-modulated output voltage illustrated in FIG. 4. A typical dimmer switch, for example, may have minimum and maximum $\alpha$ values of about 25° and 155° respectively, allowing about 98% to 2% of power to flow to the load compared to operation directly from the AC mains (AC line voltage (35)). Referring to FIG. 2, the firing angle is determined by the RC time constant of capacitor 77 (C1), resistor 76 (R1), and the impedance of the load, such as an incandescent bulb or an LED driver circuit ($Z_{LOAD}$). In typical dimming applications, $Z_{LOAD}$ will be orders of magnitude lower than R1 and resistive, thus will not affect the firing angle appreciably. When the load is comparable to R1 or is not resistive, however, the firing angle and behavior of the dimmer switch can change dramatically.

Typical prior art, off-line AC/DC converters that drive LEDs using phase modulation from a dimmer switch have several problems associated with providing a quality drive to LEDs, such as: (1) such phase modulation from a dimmer switch can produce a low frequency (about 120 Hz) in the optical output, which can be detected by a human eye or otherwise create a reaction in people to the oscillating light; (2) filtering the input voltage may require quite a substantial value of the input capacitor, compromising both the size of the converter and its life; (3) when the triac 80 is turned on, a large inrush current may be created, due to a low impedance of the input filter, which may damage elements of both the dimmer switch 75 and any LED driver; and (4) power management controllers are typically not designed to operate in an environment having phase modulation of input voltage and could malfunction.

For example, as illustrated in FIG. 5, a switching off-line LED driver 90 typically includes a full wave rectifier 20 with a capacitive filter 15, which allows current to flow to the filter capacitor ($C_{FILT}$) 15, when the input voltage is greater than the voltage across the capacitor. The inrush current to the capacitor is limited by the resistance in series with the capacitor. Under normal operating conditions there may be a Negative Temperature Coefficient resistor (NTC) or thermistor in series with the capacitor to minimize inrush current during initial charging. This resistance will be significantly reduced during operation, allowing for fast capacitor charging. This circuit will continuously peak charge the capacitor to the peak voltage of the input waveform, 169 V DC for standard 120 V AC line voltage.

When used with a dimmer switch 75, however, the charging current of the filter capacitor is limited by the dimming resistance R1 (of resistor 76) and is $I_{CHARGE}=(V_{IN}-V_{LOAD}-V_{C1})/R1$ (FIGS. 2 and 5). The voltage across the filter capacitor can be approximated to a DC voltage source due to the large difference between C1 (77) and $C_{FILT}$ (15). The charging current of the filter capacitor is also the charging current for C1, which controls the firing angle of the dimmer. The charging current for C1 will be decreased from normal dimmer operation due to the large voltage drop across the filter capacitor 15. For large values of $V_{C1}$, the current into C1 will be small and thus slowly charge. As a consequence, the small charging current may not be enough to charge C1 to the diac 85 breakover voltage during one half cycle. If the breakover voltage is not reached, the triac 80 will not turn on. This will continue through many cycles until the voltage on the filter capacitor is small enough to allow C1 to charge to the breakover voltage. Once the breakover voltage has been reached, the triac 80 will turn on and the capacitor will charge to the peak value of the remaining half cycle input voltage.

When a dimmer switch is used with a load drawing or sinking a small amount of current, $I_{LOAD}$<holding current for all values of the AC input, the triac 80 will provide inconsistent behavior unsuitable for applications with LED drivers. The nominal firing angle will increase due to the increased resistance of $Z_{LOAD}$ 81. When the capacitor (C1) voltage exceeds the diac breakover voltage, the diac 85 will discharge the capacitor into the gate of the triac 80, momentarily turning the triac on. Because the load resistance is too high to allow the necessary holding current, however, the triac 80 will then turn off. When the triac turns off, the capacitor C1 begins charging again through R1 and $Z_{LOAD}$ (81). If there is enough time remaining in the half cycle, the triac will fire again, and this process repeats itself through each half cycle. Such premature and unsustainable on-states of a triac 80 are illustrated in FIG. 3, showing the premature startup attempts of the triac 80 which can cause perceptible LED flicker.

Accordingly, a need remains for an LED driver circuit which can operate consistently with a typical or standard dimmer switch of the existing lighting infrastructure and avoid the problems discussed above, while providing the environmental and energy-saving benefits of LED lighting. Such an LED driver circuit should be able to be controlled by standard switches of the existing lighting infrastructure to provide the same regulated brightness, such as for productivity, flexibility, aesthetics, ambience, and energy savings. Such an LED driver circuit should be able to operate not only alone, but also in parallel with other types of lighting, such as incandescent lighting, and be controllable by the same switches, such as dimmer switches or other adaptive or programmable switches used with such incandescent lighting. Such an LED driver circuit should also be operable within the existing lighting infrastructure, without the need for re-wiring or other retrofitting.

SUMMARY OF THE INVENTION

The exemplary embodiments of the present invention provide numerous advantages. The exemplary embodiments allow for solid state lighting, such as LEDs, to be utilized with the currently existing lighting infrastructure and to be controlled by any of a variety of switches, such as phase modulating dimmer switches, which would otherwise cause significant operation problems for conventional switching power supplies or current regulators. The exemplary embodiments further allow for sophisticated control of the output brightness or intensity of such solid state lighting, and may be implemented using fewer and comparatively lower cost components. In addition, the exemplary embodiments may be utilized for stand-alone solid state lighting systems, or may be utilized in parallel with other types of existing lighting systems, such as incandescent lamps.

Exemplary embodiments of the present invention disclose a current regulator (power converter) for providing variable power to solid state lighting, such as LEDs, in which the current regulator couplable through a phase-modulating switch to an AC line voltage. An exemplary current regulator comprises: a rectifier; a switching power supply providing a first current; and an impedance matching circuit coupled to the switching power supply and couplable to the phase-modulating switch or to the AC line voltage, the impedance matching circuit adapted to provide a second current through the phase-modulating switch when a magnitude of the first current is below a first predetermined threshold.

In various exemplary embodiment, the impedance matching circuit comprises: a first resistor coupled to receive the first current from the switching power supply and provide a first voltage level; a second resistor; and a current switch coupled in series to the second resistor, the switch responsive to a control voltage to modulate the second current through the second resistor in response to the first voltage level. A controller may be adapted to provide the control voltage. In addition, when the phase-modulating switch has a triac, and the first predetermined threshold is at least a minimum holding current for the triac.

In an exemplary embodiment, a controller is couplable to the phase-modulating switch, and the controller is adapted to determine a root-mean-square (RMS) voltage level provided by the phase-modulating switch from the AC line voltage, and to compare the RMS voltage level to a nominal voltage level. The controller is further adapted to determine a duty cycle for pulse-width current modulation by the switching power supply in response to the comparison of the RMS voltage level to the nominal voltage level. The controller may be further adapted to determine the duty cycle based on a ratio of about a power of 3.4 of the RMS voltage level ($V_{RMS}$) to about a power of 3.4 of the nominal voltage level ($V_N$) ($V_{RMS}^{3.4}/V_N^{3.4}$), such as to determine the duty cycle "D" based on $$D \approx \frac{V_{RMS}^{3.4}}{V_{NOMINAL}^{3.4}}$$

in which $V_{RMS}$ is the RMS value of the phase-modulated (or "chopped") voltage and $V_N$ is the nominal voltage level (e.g., from the AC line voltage).

In an exemplary embodiment, the controller is further adapted to determine the nominal voltage level provided by the phase-modulating switch from the AC line voltage when a phase angle of a phase-modulated voltage level is about zero, or to determine the nominal voltage level provided by the AC line voltage, or to determine the nominal voltage level as a predetermined parameter stored in a memory. The controller may be further adapted to determine the RMS value of the phase-modulated (or chopped) voltage by determining an amplitude and a phase angle of a phase-modulated voltage level provided by the phase-modulating switch from the AC line voltage.

In another exemplary embodiment, a capacitor of the switching power supply has a capacitance sufficient to provide energy to the solid state lighting when the phase-modulating switch is not providing power from the AC line voltage. The switching power supply may further comprises a first stage and a second stage, wherein the first stage is in an off-state when the phase-modulating switch is not providing power from the AC line voltage, and wherein the second stage is in an on-state when the phase-modulating switch is not providing power from the AC line voltage. The second stage may be adapted to provide power to the solid state lighting when the phase-modulating switch is not providing power from the AC line voltage.

In another exemplary embodiment, with a controller couplable to the phase-modulating switch and to the switching power supply, the controller may be adapted to control a charging of a capacitor in the switching power supply to a first predetermined level during a first time interval, such as when the phase-modulating switch is providing power from the AC line voltage. The controller may be further adapted to determine the first predetermined level based upon a minimum voltage level of the solid state lighting and a voltage drop of the capacitor during a second time interval, such as when the phase-modulating switch is not providing power from the AC line voltage. The controller also may be further adapted to determine the first predetermined level voltage level as a function of the phase modulation performed by the phase-modulating switch, such as to determine the first predetermined level voltage level "$V_C$" as $$V_C \approx V_{LED} + \frac{I_{ml} \cdot T \cdot V_{RMS}^{3.4}}{C \cdot V_{NOMINAL}^{3.4}},$$

where $I_{ml}$ is an amplitude of current through the solid state lighting, T is a half-cycle time of the AC line voltage, and C is the capacitance of the capacitor, $V_{RMS}$ is an RMS voltage level provided by the phase-modulating switch, and $V_N$ is a nominal voltage level of the AC line voltage.

Another exemplary embodiment of the present invention implements a power converter for providing variable brightness levels for solid state lighting, with the power converter couplable to a phase-modulating switch which is couplable to an AC line voltage. The exemplary power converter comprises: a switching power supply providing a first current; and an active impedance matching circuit coupled to the switching power supply, the active impedance matching circuit adapted to provide a variable, second current in response to a magnitude of the first current.

Another exemplary embodiment of the present invention implements a current regulator for providing variable brightness levels for solid state lighting, also with the current regulator couplable to a phase-modulating switch coupled to an AC line voltage. In an exemplary embodiment, the current regulator comprises: a rectifier; a switching power supply providing a first current; an impedance matching circuit coupled to the switching power supply and couplable to the phase-modulating switch or to the AC line voltage, the impedance matching circuit adapted to provide a second current through the phase-modulating switch when a magnitude of the first current is below a first predetermined threshold; and a controller coupled to the switching power supply and couplable to the phase-modulating switch, the controller adapted to determine a root-mean-square (RMS) voltage level provided by the phase-modulating switch from the AC line voltage and to determine a duty cycle for pulse-width current modulation by the switching power supply in response to the comparison of the RMS voltage level to a nominal voltage level.

Another exemplary embodiment of the present invention implements a current regulator for providing variable brightness levels for a plurality of light emitting diodes, with the current regulator couplable to a phase-modulating switch which is coupled to an AC line voltage. In an exemplary embodiment, the current regulator comprises: a switching power supply providing a first current; and a controller coupled to the switching power supply and couplable to the phase-modulating switch, the controller adapted to provide power to the plurality of light emitting diodes when the phase-modulating switch is not providing power from the AC line voltage.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF EXEMPLARY EMBODIMENTS

Figure 1:
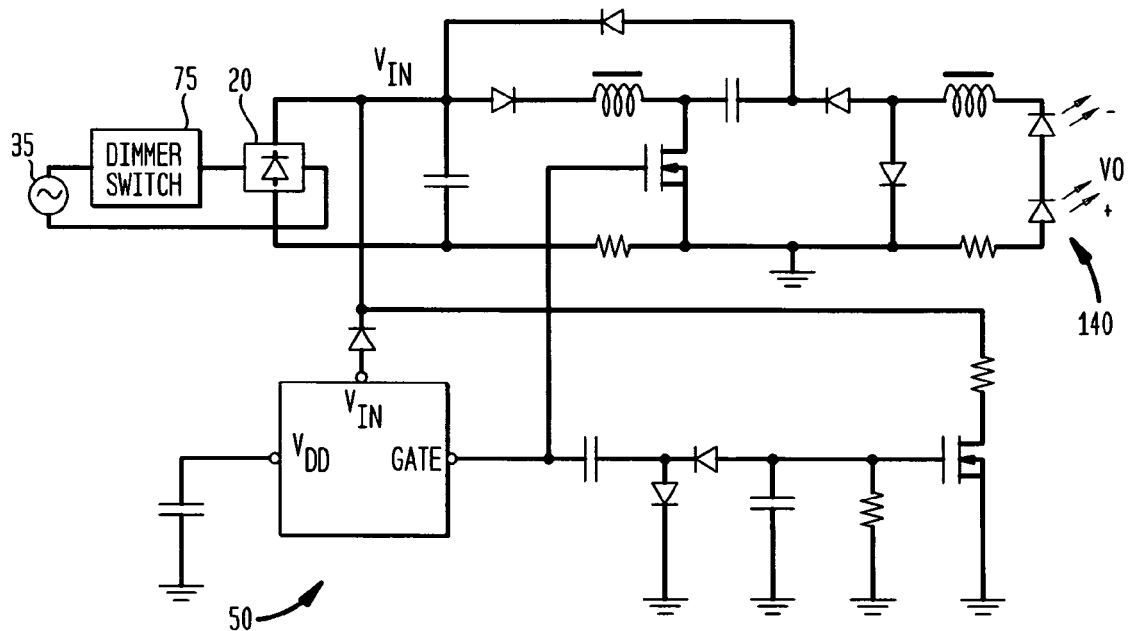
FIG. 1 is a circuit diagram of a prior art current regulator.
Figure 2:
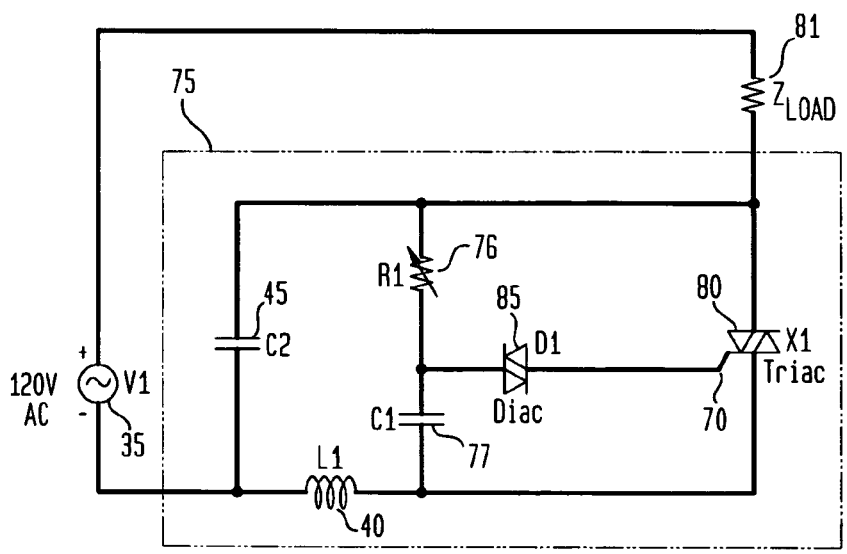
FIG. 2 is a circuit diagram of a prior art dimmer switch.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

As mentioned above, while solid state lighting (such as LED lighting) has significant environmental and energy-saving benefits, their adoption as the lighting technology of choice is less likely if they cannot be integrated into or otherwise made compatible for operation with the existing lighting infrastructure. In accordance with the present invention, therefore, an LED driver circuit is provided which is compatible for operation with the existing lighting infrastructure, such as dimmer switches, and may be coupled directly to and controlled by such dimmer switches. In another exemplary embodiment, anticipating future changes in lighting infrastructure, an LED driver circuit is provided which is couplable directly to an AC line voltage while nonetheless adapted to be controlled by a standard dimmer switch.

It is anticipated that the transition to solid state lighting, such as LED lighting, will occur in several phases. In a first phase, LED driver circuits and LEDs will be wired within existing lighting infrastructure, such as replacing an incandescent bulb (placed within an Edison socket) or replacing an incandescent lamp, with wiring to existing switches, such as dimmer switches. In a second phase, existing switching connections may be re-wired, allowing LED driver circuits to be co-located in the same junction or wall box as the switches, but wired directly to the AC line voltage, with existing switching (such as dimmers) generating only a control signal to regulate LED brightness. In a third phase, LED driver circuits with user interfaces may completely replace the existing switching and lighting infrastructure, providing the most appropriate form of control for solid state lighting.

For example, such first phase technology is based on an LED driver capable of working using the phase modulated (or chopped) AC signal from a standard dimmer switch 75. As discussed in greater detail below, this LED driver may operate directly from the phase modulated AC signal under the control of the dimmer circuit, or may include an input circuit for emulating dimmer performance, similar to incandescent lamp requirements. In exemplary embodiments, very compact and highly efficient LED drivers are provided, to meet anticipated size and thermal restrictions. Digital controllers may also be utilized, as discussed below.

It may also be assumed during a first phase that dimmer switches generally and initially will not be changed or rewired, so all of their existing performance characteristics will be maintained, such as power harmonics, inrush currents during initial powering on, electromagnetic interference, and audio harmonics (such as buzzing). During a second phase, as other forms of control technology may be utilized, it is anticipated that these problems will be minimized or disappear.

Figure 6:
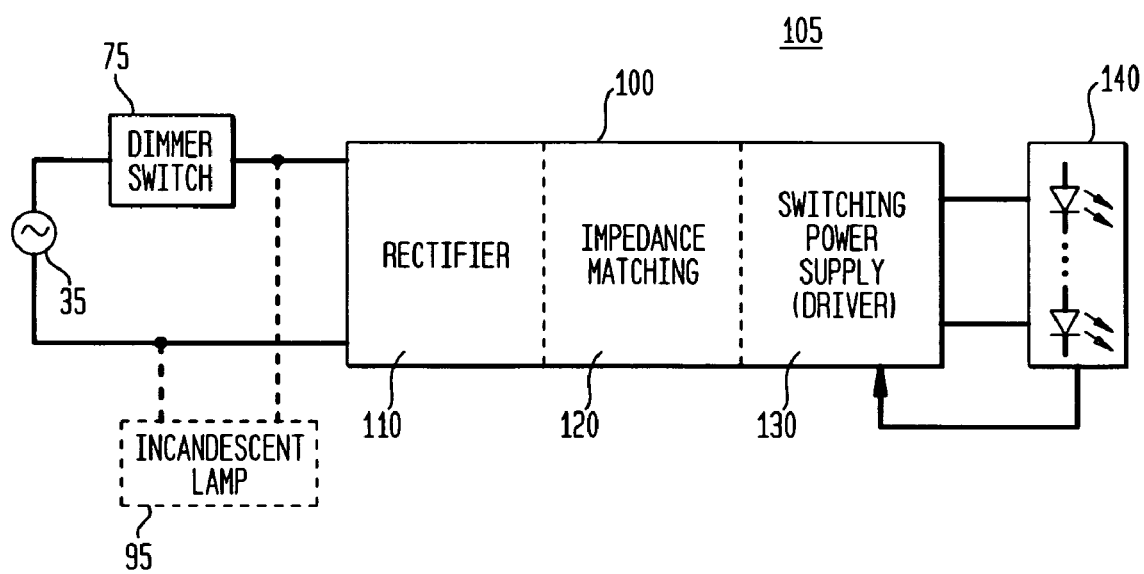
FIG. 6 is a block diagram of an exemplary first embodiment of a current regulator (or converter) in accordance with the teachings of the present invention.

FIG. 6 is a block diagram of an exemplary first embodiment of a current regulator (or converter) 100 in accordance with the teachings of the present invention. The current regulator 100 provides power to one or more LEDs 140, which may be an array or multiple arrays of LEDs 140 or any type or color, with the regulator 100 and LEDs 140 forming a system 105. The current regulator 100 is compatible with existing lighting infrastructure, and may be coupled directly to a dimmer switch 75 for receiving a phase-modulated AC voltage derived from the AC line voltage (AC Mains) (35). In addition, the current regulator 100 may operate in parallel with an incandescent lamp 95, under the common control of the dimmer switch 75.

As illustrated, the current regulator 100 comprises a rectifier 10, an impedance matching circuit 120, and a switching power supply (or driver) 130. The switching power supply 130, in exemplary embodiments, may also be adapted to receive feedback from the LEDs 140.

Figure 7:
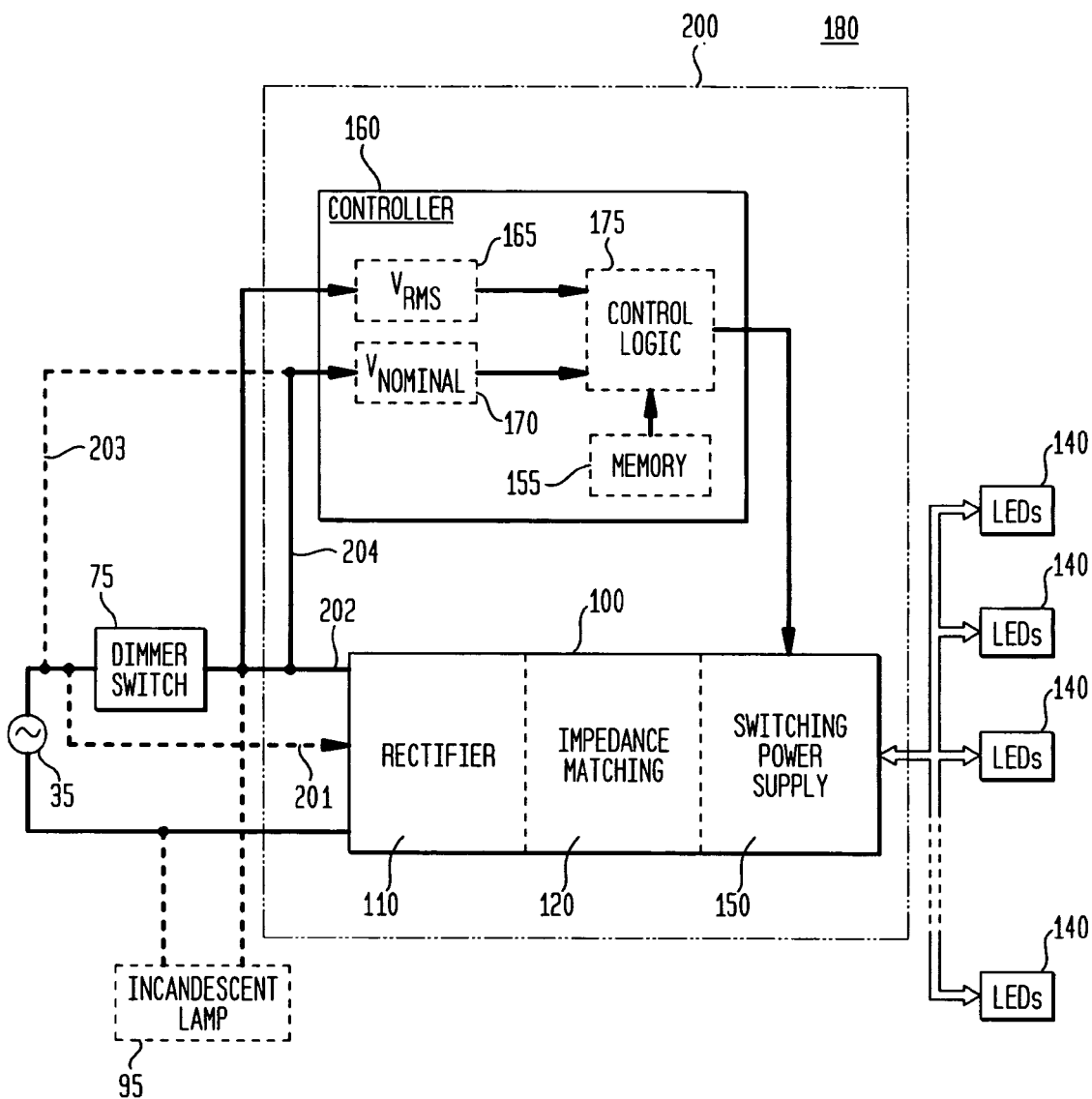
FIG. 7 is a block diagram of an exemplary second embodiment of a current regulator (or converter) in accordance with the teachings of the present invention.

FIG. 7 is a block diagram of an exemplary second embodiment of a current regulator (or converter) 200 in accordance with the teachings of the present invention. The current regulator 200 comprises a rectifier 110, an impedance matching circuit 120, a switching power supply (or driver) 150, and further includes a controller 160 coupled to receive an output from the dimmer switch 75. The current regulator 200 also provides power to one or more LEDs 140, which also may be an array or multiple arrays of LEDs 140 or any type or color, with the regulator 200 and LEDs 140 forming a system 180.

The current regulator 200 may be coupled directly to a dimmer switch 75 (line 202) for receiving a phase-modulated AC voltage derived from the AC line voltage (35), and may operate in parallel with an incandescent lamp 95, under the common control of the dimmer switch 75. Alternatively, as an additional advantage, the current regulator 200 may be coupled directly to the AC line voltage 35 (illustrated by dashed line 201), and also may operate in parallel with an incandescent lamp 95. In the latter case, the controller 160 (and 260, FIG. 10) is programmed, adapted or configured to emulate the brightness or intensity control provided by the dimmer switch 75, to control the switching power supply 150 and correspondingly modify the brightness (or intensity) provided by the LEDs 140.

As discussed in greater detail below, the controller 160 is adapted to determine the RMS (root-mean-square) voltage of the phase-modulated signal provided by the dimmer switch 75 (using $V_{RMS}$ sensor 165) (i.e., which may or may not be significantly phase-modulated at any given time), to determine the nominal voltage provided by the dimmer switch 75 without dimming (when $\alpha \approx 0$) or by the AC line voltage 35 (using $V_{NOMINAL}$ sensor 170 or a $V_{NOMINAL}$ parameter stored memory 155) (i.e., the RMS value of the full or non-phase-modulated voltage provided by the AC line voltage 35 or provided by the dimmer switch 75 when $\alpha$ is zero or close to or about zero ($\alpha \approx 0$)), and to provide a control signal to the switching power supply 150, using control logic block 175. The RMS and nominal voltage sensors 165, 170 (and/or memory 155) are utilized to provide emulation of the optical performance of an incandescent lamp 95. (As used herein, the RMS voltage $V_{RMS}$ will refer to the RMS value of the "chopped" voltage of the phase-modulated signal (e.g., provided by the dimmer switch 75), while the nominal voltage $V_{NOMINAL}$ (or $V_N$) will refer the RMS value of the voltage of the full or non-phase-modulated signal provided by the AC line voltage 35 or provided by the dimmer switch 75 when $\alpha$ is zero or close to or about zero. Under conditions of dimming (when $\alpha > 0$), $V_{RMS}$ will be less than $V_{NOMINAL}$.) The exemplary embodiments advantageously utilize a ratio of $V_{RMS}$ to $V_{NOMINAL}$ to control and provide variable brightness or intensity levels of the optical output of the LEDs 140. More specifically, the exemplary embodiments provide for emulating the optical output of incandescent lamps utilizing such a ratio of $V_{RMS}$ and $V_{NOMINAL}$, each raised to a selected power which, in exemplary embodiments, is about 3.4, as discussed below.

The impedance matching circuit 120 provides an appropriate output impedance for a dimmer switch 75 to maintain its minimum holding current, creates a series impedance with the RC network (76, 77) of the dimmer switch 75 to ensure a correct firing angle when it is interconnected with a switching LED driver, and provides an appropriate input impedance for a stable operation of the switching LED driver 100, 200 and systems 105, 180. In exemplary embodiments, the impedance matching circuit 120 is a combination of active and passive components adapted to meet the requirements of both the dimmer switch 75 and the regulators (converters or drivers) 100, 200.

Figure 3:
FIG. 3 is a graphical diagram illustrating premature startup in a prior art current regulator coupled to a dimmer switch which causes perceptible LED flicker.
Figure 4:
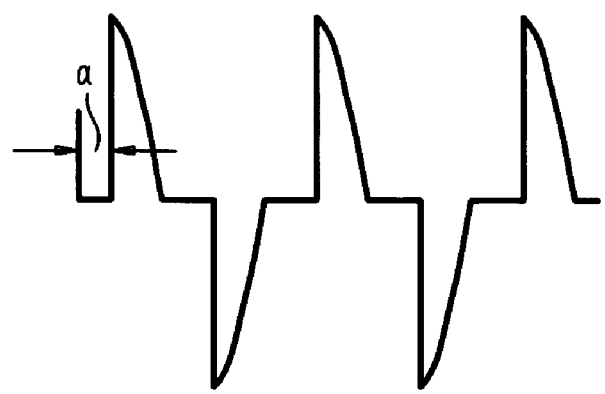
FIG. 4 is a graphical diagram illustrating the phase modulated output voltage from a standard dimmer switch.
Figure 5:
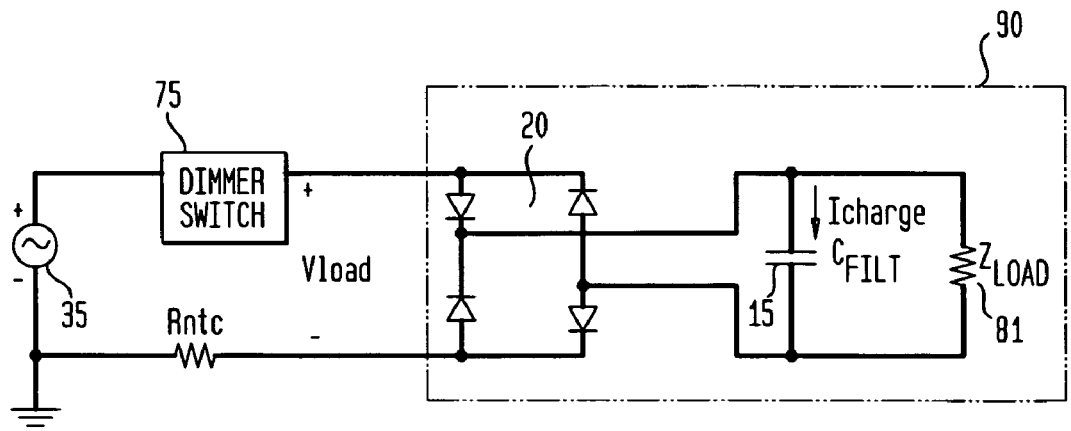
FIG. 5 is a high-level block and circuit diagram of a generalized prior art current regulator (or converter).

More particularly, the exemplary embodiments of the impedance matching circuit 120: (1) provide sufficient holding current for the dimmer switch 75 to remain in an on-state, independently of the load current; (2) provide a path for the gating circuit (capacitor 77, resistor 76 and diac 85) of the dimmer switch 75 to fire correctly (and avoid the premature start up and improper firing illustrated in FIG. 3); and (3) reduce the amount of current through the impedance matching circuit 120 when sufficient current is provided by a corresponding load.

One comparatively inefficient, prior art method to create impedance matching would be to simply use a load resistor, $R_L$, across the dimmer switch 75, thereby providing a load current of at least $V_{TRIAC}/R_L$ when the triac 80 is firing. By setting the resistor values small enough, the current can be made sufficiently high to ensure that it is always above the threshold current (typically in the vicinity of 50 mA~100 mA) needed to keep the triac 80 in an on state. The power dissipation across the resistor $R_L$ would be extremely high, i.e., $120^2/R_L$ when the phase angle (firing angle $\alpha$) is small, further resulting in creation of significant heat. Such a load resistance it typically provided by an incandescent lamp, but is not automatically provided by an electronic or switchable load, such as a switching LED driver system.

Further, it is not always necessary to add more current to the triac 80 when it is turning on, particularly if multiple lamps are being used (incandescent bulbs or LEDs) which are drawing sufficient current. Thus, in accordance with the present invention, instead of a "dummy" resistor $R_L$, an active circuit is used which is capable of adjusting its impedance according to the needs of the dimmer switch 75. The active load would only supplement the current necessary to allow the triac 80 to switch on (fire) and to hold it in an on-state as desired. The exemplary embodiments are also more power efficient, reducing the supplemented current (and therefore $I^2R$ power loss) when there are other loads providing or sinking currents or when the phase angle $\alpha$ is small.

Figure 8:
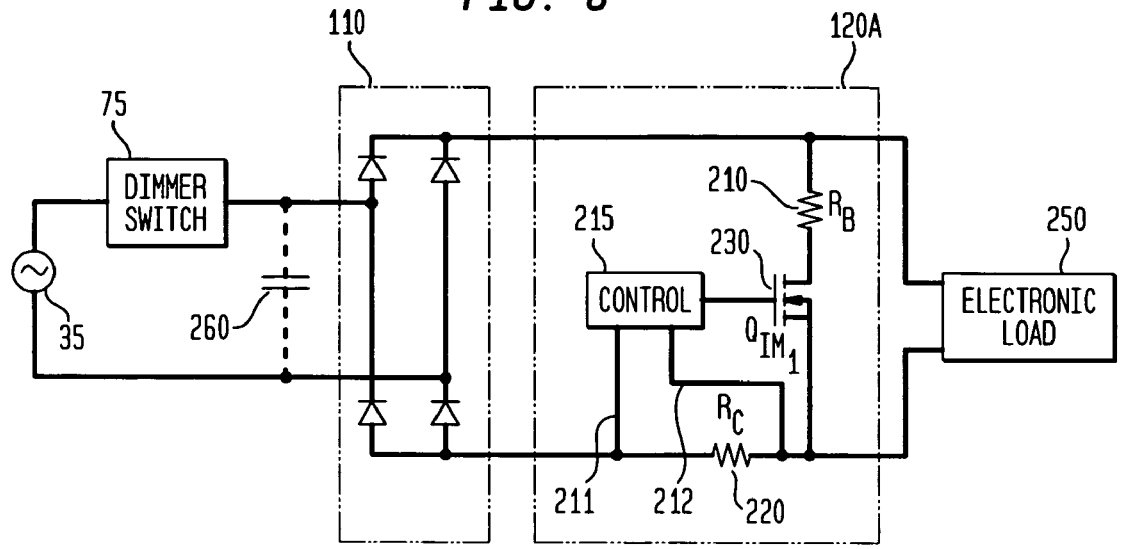
FIG. 8 is a circuit diagram of an exemplary first embodiment of an impedance matching circuit for a current regulator (or converter) in accordance with the teachings of the present invention.

FIG. 8 is a circuit diagram of an exemplary first embodiment of an impedance matching circuit 120A for a current regulator (or converter) 100, 200 in accordance with the teachings of the present invention. In exemplary embodiments, the "electronic" load 250, for example, is a system 105, 180, such as a current regulator (or converter) 100, 200 coupled to LEDs 140. The impedance matching circuit 120A has small power loss. Using a control signal such as a control voltage from control block 215, impedance matching circuit 120A can insert extra or additional current for the dimmer switch 75 to turn on the triac 80 and sustain an on-state when the load current is insufficient. The control signal may be provided from a variety of sources, such as from a controller 160, 260 (not separately illustrated). Such a control signal, for example, may be derived from a detected voltage across current sense resistor 220, as an indicator of the load current. For example, the control block 215 (e.g., controller 160, 260) may be coupled (lines 211, 212) to detect or otherwise receive feedback of the voltage across current sense resistor 220. When the load current, which goes through sensing resistor 220 ($R_C$), is too small and unable to fire the triac 80 in the dimmer switch 75, the impedance matching circuit 120A operates as a linear regulator to insert needed extra current, turning on switch 230 and providing for increased current through resistor 210. The impedance matching circuit 120A provides a regulated impedance based on the condition of the electronic load 250, and extra power loss is reduced. A typical electronic load, for example and without limitation, would be a current regulator 100, 200 coupled to LEDs 140. The resistance of resistor 210 ($R_B$) limits the maximum current that can be provided through the switch 230. The switch 230 is turned off when load current can create sufficient voltage on resistor 220 ($R_C$). An optional capacitor 260 (providing an EMI filter) (e.g., typically 0.47 uF (impedance 5-6 k Ohms)) can be used to provide an extra current (e.g., 20 mA) and further reduce losses. While illustrated as an n-channel enhancement MOSFET, any type of switch 230 may be utilized, including a depletion-mode FET (235) illustrated in FIG. 9 or any other type of FET, JFET, BJT, hybrid IGBT, etc.

The impedance matching circuit 120A (and 120B, discussed below) can operate both in a linear mode and a switched mode. In a linear mode, the gate-to-source voltage of the switch (transistor 230, 235) may be varied throughout the linear operational region, from below the threshold voltage, to the threshold voltage and up to the saturation voltage, to modulate the amount of current through resistor 210. In a switched mode, the gate-to-source voltage of the switch (transistor 230, 235) may be either below the threshold voltage or at or above the saturation voltage, to correspondingly provide either no current or a full (saturation) level of current, respectively, such that the amount of supplemented current is limited by the value of the resistance of resistor 210 in the latter case.

Figure 9:
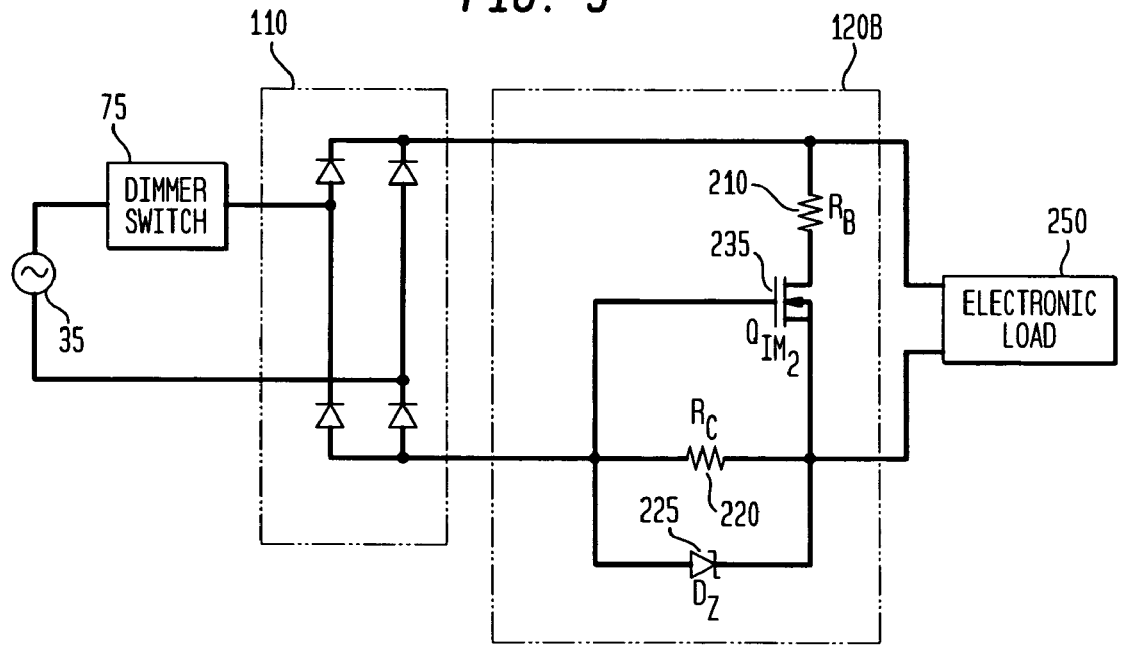
FIG. 9 is a circuit diagram of an exemplary second embodiment of an impedance matching circuit for a current regulator (or converter) in accordance with the teachings of the present invention.

FIG. 9 is a circuit diagram of an exemplary second embodiment of an impedance matching circuit 120B for a current regulator (or converter) 100, 200 in accordance with the teachings of the present invention. As illustrated, the impedance matching circuit 120B utilizes a MOSFET switch 235, implemented as a depletion MOSFET (illustrated as n-channel MOSFET), having an on-state (and fully conducting) as a default mode when its gate-to-source voltage is above a threshold voltage (which may be zero volts, for example), and becomes less conducting an ultimately enters an off-state (non-conducting) when its gate-to-source voltage is below the threshold voltage (i.e., more negative than the threshold voltage). When utilized with a control circuit (e.g., 215 or a controller 160, 260, not separately illustrated), rather than the gate connection to the sense resistor 220, the switch 235 may also be operated in either switched or linear modes as discussed above. As illustrated in FIG. 9, the switch 235 will operate in a linear mode, with its gate-to-source voltage varying in response to the voltage generated across the current sense resistor 220.

When conducting, current can be provided through resistor 210, enabling sufficient current to maintain a holding current for the dimmer switch 75. When the dimmer switch 75 is in an on-state and current is provided to the electronic load 250, the voltage generated across the resistor 220 is utilized to gate (or modulate) and turn off the switch 235, as those (negative) voltages approach or become more negative than the threshold voltage of the switch 235, and thereby reduce the current through resistor 210. Voltage limitation of the gate-to-source voltage is provided by a zener diode 225, although other types of voltage limiters may be utilized equivalently. Resistors 210 and 220 are sized appropriately to generate the desired voltages and corresponding levels of current, to provide the corresponding voltages for the selected switching or gating of the MOSFET switch 235 as additional current may or may not be needed. In this embodiment, the control voltage is the gate-to-source voltage, and is automatically generated by a current through the current sense resistor 220, with the total voltage being limited by a voltage limiter such as the zener diode 225. As mentioned above, a control circuit 215 (or controller 160, 260) may be utilized instead, as illustrated in FIG. 8, and may provide either or both linear and switched modes.

Figure 10:
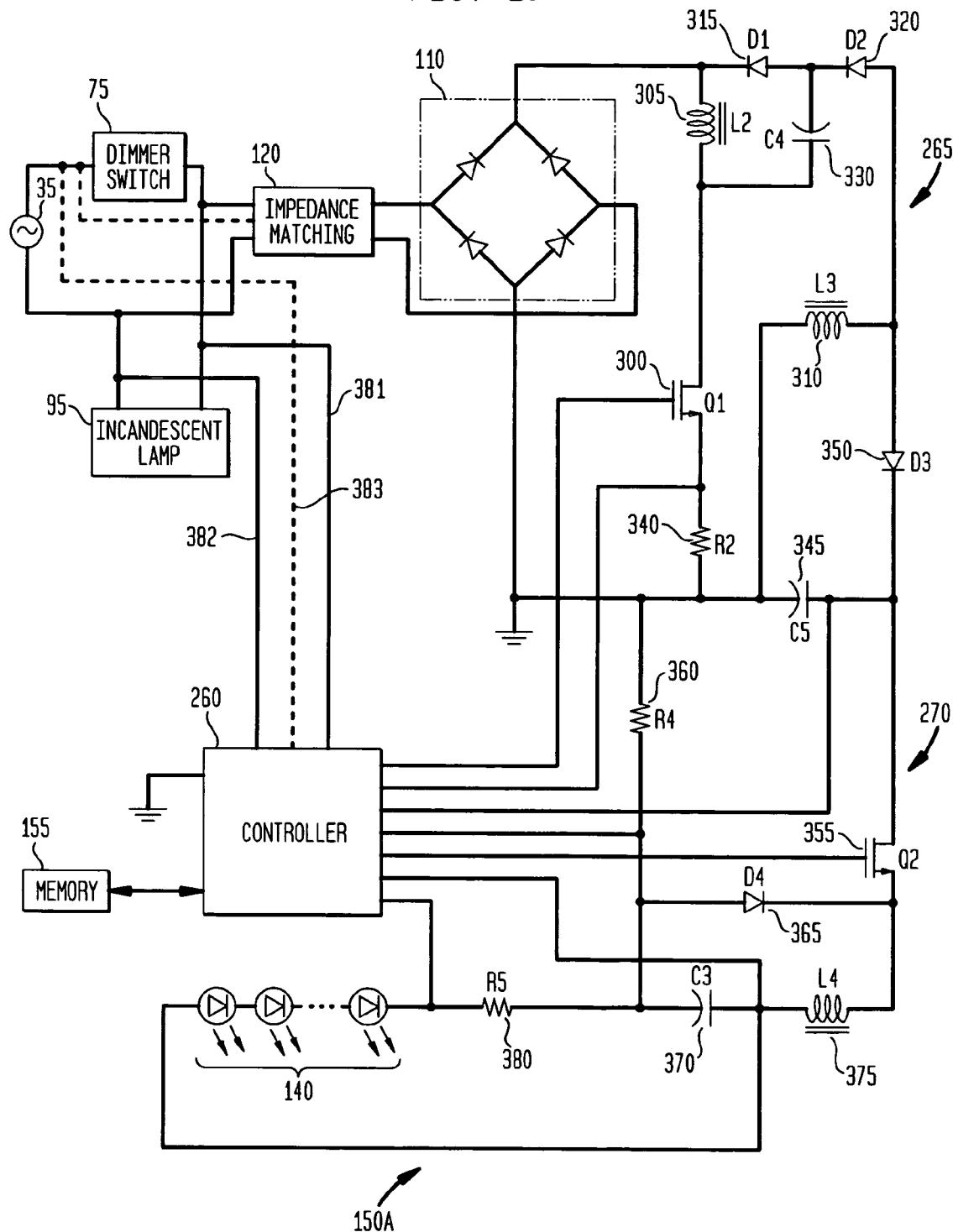
FIG. 10 is a circuit diagram of an exemplary embodiment of a switching power supply for a current regulator (or converter) in accordance with the teachings of the present invention.

It should be noted that the impedance matching circuit 120, such as the exemplary impedance matching circuits 120A and 120B, may be located in a wide variety of places in the various systems 105, 180. For example, the impedance matching circuit 120 may be positioned between the rectifier 110 and any applicable load 250, as illustrated in FIGS. 8 and 9. Alternatively and equivalently, the impedance matching circuit 120 may be placed before or in advance of the rectifier 110 (i.e., across the dimmer switch 75 and the AC line voltage 35), as illustrated in FIG. 10. Also alternatively and equivalently, the impedance matching circuit 120 may be placed in any circuit position in parallel with the load 250 to provide the novel current sinking of the present invention.

Referring again to FIG. 7, the operation of the controller 160 may be described in greater detail, for controlling the brightness or intensity of the optical output of LEDs 140, independently or in parallel with an incandescent lamp 95. Optical output of an incandescent lamp or bulb is proportional to the RMS voltage across its filament in about a power of 3.4, namely, $F \propto V^{3.4}$, where F is the Flux in Lm, and V is the RMS voltage. In accordance with the exemplary embodiments, the dimming of the LEDs 140, such as high-brightness LEDs, is controlled through corresponding changes in the duty cycle of a pulse-width modulated ("PWM") driver, such as the drivers within a switching power supply 150 (or the drivers of FIG. 10, discussed below). This duty cycle is calculated based on the ratio of the sensed RMS phase modulated voltage signal ($V_{RMS}$) to a nominal RMS AC line voltage $V_{NOMINAL}$ (from AC line voltage 35, from a dimmer switch 75 when $\alpha \approx 0$, or from a $V_{NOMINAL}$ parameter stored in memory 155). Accordingly, assuming an approximately linear dependence of optical output from LEDs 140 with the duty cycle of providing energy to the LEDs 140, the novel and inventive approach to duty cycle adjustment for PWM may be expressed as (Equation 1):

$$D \approx \frac{V_{RMS}^{3.4}}{V_{NOMINAL}^{3.4}},$$

where D is the operational duty cycle for PWM dimming of LEDs 140; $V_{RMS}$ is the operational RMS voltage during phase-modulation; and $V_{NOMINAL}$ is the nominal RMS voltage discussed above, when firing angle $\alpha \approx 0$ or ($\alpha = 0$).

The brightness control consists of the following steps: (1) regulating brightness by phase modulation of the input AC voltage, such as through a dimmer switch 75; (2) applying the phase modulated voltage to the incandescent lamp 95; (3) measuring the RMS value of phase modulated voltage $V_{RMS}$, such as using $V_{RMS}$ sensor 165 in controller 160, 260; (4) calculating the duty ratio (duty cycle) D for LED 140 dimming as proportional to corresponding changes of RMS voltage (i.e., the change in $V_{RMS}$ compared to $V_{NOMINAL}$), thereby emulating the optical output of the incandescent lamps 95; and (5) dimming LEDs 140 through pulse width modulation of their current, keeping the amplitude of the current constant and the duty ratio variable to emulate the perceived output of an incandescent lamp.

As mentioned above, this methodology may be implemented in a controller 160 (or 260). By adjusting the duty ratio according to the nonlinear relation of Equation 1, the dimming of LEDs 140 is effectively identical or similar in brightness to the dimming of incandescent lamps or bulbs on the same switch.

In addition, this methodology may be implemented without supplying the phase-modulated AC voltage from the dimmer switch 75 to the current regulator (or converter) 200 (on line 202). Instead, the current regulator (or converter) 200 may be coupled directly to the AC line voltage (line 201), with corresponding dimming provided through the operation of the controller 160 by emulation of incandescent dimming.

The RMS voltage $V_{RMS}$ may be sensed using a wide variety of methods. For example, a first proposed method utilizes an RMS converter of the phased-modulated signal provided by the dimmer switch 75. A second proposed method of sensing the RMS voltage is based on measurements of the duty ratio of the firing angle α of the dimmer switch 75 to the half cycle angle (π) and the amplitude of the operational AC voltage, and then calculating the RMS value of the phase modulated signal. The nominal RMS voltage $V_{NOMINAL}$ may also be measured or calculated as described above, such as using a voltage measurement directly from the AC line voltage 35, or measured (sensed) from the phase-modulating dimmer switch 75 when α≈0. The nominal RMS voltage $V_{NOMINAL}$ may also be calculated or predetermined, such as using a calculated value assuming typical or standard voltage and frequency levels provided by the AC line voltage 35, e.g., 115 V, with a $V_{NOMINAL}$ parameter value for the nominal RMS voltage stored in memory 155. For example, $V_{NOMINAL}$ (or, equivalently, $V_N$) may be calculated and stored as a parameter in a memory circuit 155, such as a FLASH or other programmable memory, as an expected or anticipated value of the nominal AC voltage. Alternatively, the $V_{NOMINAL}$ sensor 170 may be implemented similarly to the $V_{RMS}$ sensor 165, to measure a voltage level under full brightness conditions (no dimming, when a is zero) or measured directly from the AC line voltage 35.

Figure 11:
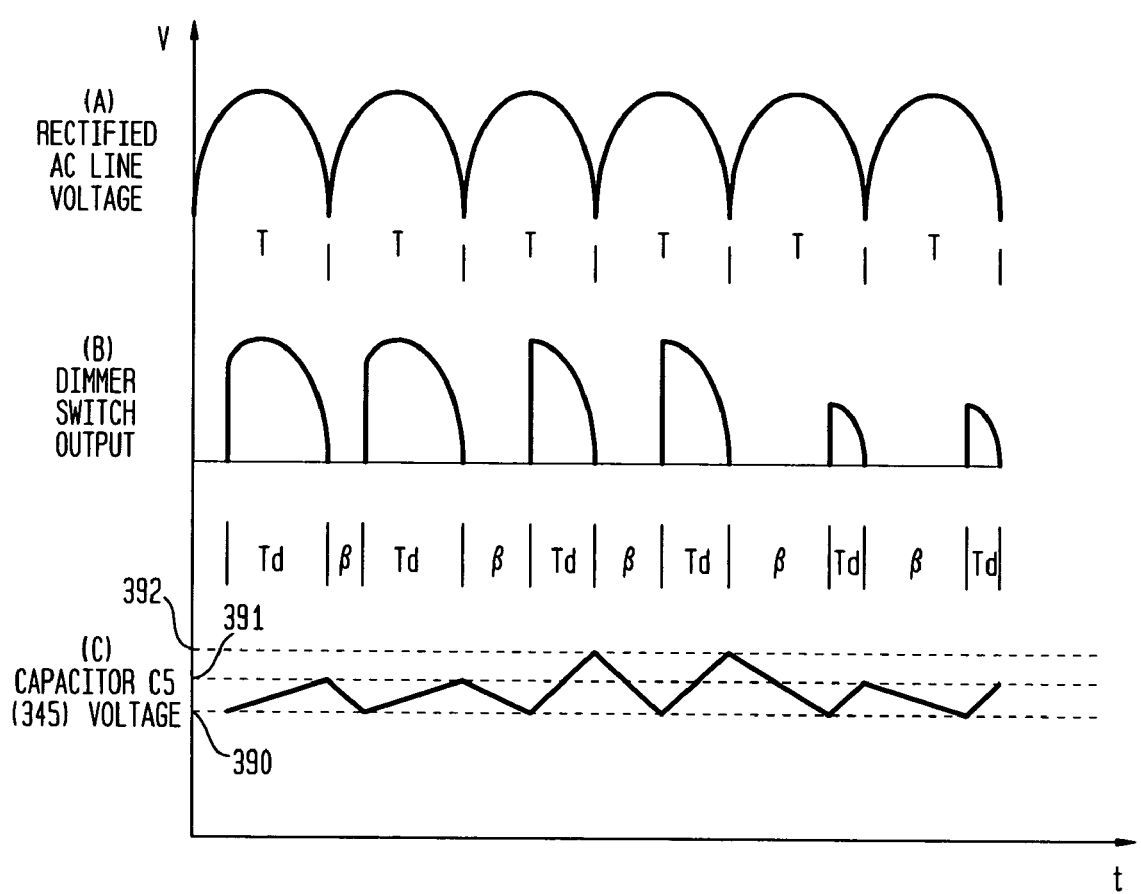
FIG. 11 is a graphical diagram selected voltages which may be found in exemplary embodiments of a current regulator (or converter) in accordance with the teachings of the present invention.

FIG. 10 is a circuit diagram of an exemplary embodiment of a switching power supply 150A for a current regulator (or converter) 100, 200 in accordance with the teachings of the present invention. FIG. 11 is a graphical diagram selected voltages which may be found in exemplary embodiments of a current regulator (or converter) 100, 200 or system 105, 180 in accordance with the teachings of the present invention.

In accordance with the present invention, two modes of operation of the current regulator (or converter) 100, 200 are provided. In a first mode, when the dimmer switch 75 is not providing any power (is non-conducting), such as in the "β" time intervals illustrated in FIG. 11, the current regulator (or converter) 100, 200 is in an off-state and no power is provided to the LEDs 140. Operation in this first mode, for example, may be provided through the selection of capacitors having comparatively smaller capacitance values, as discussed below, using virtually any type of switching power supply. In a second mode, such as for the switching power supply 150A illustrated in FIG. 10, when the dimmer switch 75 is not providing any power (is non-conducting) (in the "β" time intervals), the current regulator (or converter) 100, 200 is still in an on-state and power continues to be provided to the LEDs 140. Operation in this second mode, for example, may be provided through the selection of capacitors having comparatively larger capacitance values, as discussed below, using a somewhat more sophisticated switching power supply, such as the two-stage switching power supply 150A.

As illustrated in FIG. 10, the switching power supply 150A is coupled via impedance matching circuit 120 to a phase modulation module/dimmer, such as a dimmer switch 75, and is intended to operate in the second mode of operation mentioned above. The switching power supply 150A is implemented in two stages, an AC/DC converter 265 and a buck converter 270. The AC/DC converter 265 is utilized to provide a high input impedance, thereby eliminating the high input capacitance that the single stage approaches have (and which can cause triacs of dimmers to misfire, as previously mentioned). This first stage will convert a relatively poor, phased modulated AC voltage into a manageable DC voltage, while the second stage (buck converter 270) will perform LED driving using current PWM, through switching transistor 355 (Q2).

The quadratic AC/DC converter 265 portion of switching power supply 150A is connected to the dimmer switch 75 via an impedance matching circuit 120. The AC/DC converter 265 comprises major elements such as switch Q1 (300), inductors L2 (305) and L3 (310), capacitors C4 (330) and C5 (345), diodes D1 (315) and D2 (320), and current sense resistor R2 (340). Buck converter 270 portion of switching power supply 150A generally comprises a switching transistor Q2 (355) (for dimming), inductor L4 (375), capacitor C3 (370), and current sense resistor R4 (360). The switching power supply 150A also comprises controller 260, which provides the functionality of the controller 160 previously discussed, and the additional functionality discussed below.

As discussed above, the controller 260 may determine $V_{RMS}$ using measurements from connections to the output of dimmer switch 75 on lines 381 and 382; may determine $V_{NOMINAL}$ using measurements from connections to the output of dimmer switch 75 on lines 381 and 382, using measurements from connections to the AC line voltage 35 on lines 382 and 383 (dashed line), or using stored parameter values. The controller 260 correspondingly adjusts the duty cycle of the pulse-width modulation of current provided to the LEDs 140 through switching transistor 355 (Q2).

For the first mode of operation, when the dimmer switch 75 is not providing any power (is non-conducting), such as in the "β" time intervals illustrated in FIG. 11, the current regulator (or converter) 100, 200 is in an off-state and no power is provided to the LEDs 140.

For the second mode of operation, sufficient energy will be stored in capacitor C5 (345), such that the switching power supply 150A is capable of providing power and energizing LEDs 140, when the dimmer switch 75 is not providing any power (is non-conducting) (in the "β" time intervals). This second mode of operation enables significantly more sophisticated control over the optical output of LEDs 140.

When the dimmer switch 75 is providing power, such as in the "Td" time intervals illustrated in FIG. 11, phase-modulated current is provided to the impedance matching circuit 120 and the bridge rectifier 110. Switch Q1 (300) is typically switched on and off at a comparatively high frequency. When Q1 (300) is on and conducting, energy is stored in inductor L2 (305) and inductor L3 (310). When Q1 (300) is off, the energy stored in inductor L2 is transferred to capacitor C4 (330), and the energy stored in inductor L3 is transferred to capacitor C5 (345). During this time, energy stored in capacitor C5 (345) is provided as current to LEDs 140, using PWM controlled by controller 260 through switch Q2 (355), with the duty cycle of PWM determined as discussed above.

When the dimmer switch 75 is not providing any power (is non-conducting) (in the "β" time intervals) the quadratic AC/DC converter 265 is effectively turned off, with the controller 260 turning off switch Q1 (300). The second stage of the switching power supply 150, converter 270, however, continues to operate and provide LEDs 140 with a regulated current (i.e., operates continuously, during both Td and β time intervals). As mentioned above, when capacitor C5 (345) has a sufficient capacitance value, it has sufficient stored energy to continue to provide PWM current to LEDs 140, with the PWM also controlled by controller 260 through switch Q2

(355), and with the duty cycle of PWM determined as discussed above. (In exemplary embodiments, capacitor C4 (330) may also be provided with a comparatively large capacitance value.)

To provide this second mode of operation, in accordance with the present invention, the voltage level of capacitor C5 (345) "$V_C$" is always maintained at or above the voltage level required by the LEDs 140 ("$V_{LED}$"), illustrated by line 390 in FIG. 11, part C. When the dimmer switch 75 is providing power, illustrated in the "Td" time intervals of FIG. 11, the capacitor C5 (345) is charged to a sufficiently high voltage such that, when it is discharged during the "β" time intervals when the dimmer switch 75 is not providing any power, its voltage level $V_C$ does not drop below the minimum voltage required to energize the LEDs 140 to provide optical output. Depending upon the degree of phase modulation provided by dimmer switch 75, however, these intervals Td and "β" may (and typically will) be variable, as illustrated in FIG. 11. In accordance with the exemplary embodiments of the invention, therefore, during comparatively shorter intervals of Td (and longer β intervals) when more phase modulation is occurring (i.e., higher firing angle α), capacitor C5 (345) is charged to a higher voltage level, illustrated as line 392 in FIG. 11, while during comparatively longer intervals of Td (and shorter β intervals) when less phase modulation is occurring (i.e., smaller firing angle α), capacitor C5 (345) is charged to a comparatively lower voltage level, illustrated as line 391 in FIG. 11. Control of the charging to these voltage levels is provided by controller 260, using the methodology described below.

The AC/DC converter 265, with the charging of the capacitor C5 (345) to the desired voltage level under the control of controller 260, has been developed based on the following analysis. If an LED driver takes its energy from a capacitor, the voltage drop $\Delta V_C$ across capacitor 345 will be (Equation 2):

$$\Delta V_{c-} = \frac{I_{ml} \cdot D \cdot T}{C},$$

where $I_{ml}$ is the amplitude of the LED current, D is the Dimming Duty Cycle, T is the half-cycle time of the input AC Voltage (illustrated in FIG. 11), and C is the capacitance of the selected capacitor, in this case, capacitor C5 (345). To maintain the energy in the capacitor C5 (345), it should be charged to restore the same $\Delta V_c$ during the operation of the AC/DC converter 265 from the output of dimmer switch 75, namely (Equation 3):

$$\Delta V_{c+} = \frac{I_D \cdot T_d}{C},$$

where $I_D$ is the average charging current, and Td is the time period during which the phase-modulated, rectified AC voltage is greater than zero, i.e., 0<Td<T, as illustrated in FIG. 11B and discussed above.

Assuming a voltage ripple in which $\Delta V_{C+}=\Delta V_{C-}$ and there is no transformer in the LED driver structure, then the minimum voltage across the capacitor C5 (345) is $V_{LED}$, which is the voltage drop across LEDs 140 having $I_{ml}$ current. This provides the inventive regulation of the (lossless) AC/DC converter 265 as follows (Equation 4):

$$V_c = V_{LED} + \frac{I_{ml} \cdot D \cdot T}{C}.$$

It should be noted that strict equality of these various relations is not required, and some variation is allowable and expected.

Alternatively, the voltage level $V_C$ to which capacitor C5 (345) should be allowed to charge during the Td time intervals, under the control of the controller 260, may be expressed equivalently as (Equation 5):

$$V_C \approx V_{LED} + \frac{I_{ml} \cdot T \cdot V_{RMS}^{3.4}}{C \cdot V_{NOMINAL}^{3.4}},$$

also illustrating a non-strict equality for the control of the voltage level $V_C$.

In addition, it should also be noted that the voltage level $V_C$ may be sensed or measured, such as via the illustrated connection from the capacitor C5 (345) to the controller 260. Accordingly, the controller 260 provides various control signals to the switch 300, during the Td intervals, to control the charging of capacitor C5 (345).

Alternatively, based on the required duty ratio, calculated from measuring phase modulated signal from the dimmer, according to Equation 1, the voltage across capacitor C5 (345) should be charged according to Equations 4 and/or 5 to the value $V_C$ (illustrated in FIG. 11, part C, which illustrates two different voltage levels for $V_C$, on lines 391 and 392, and the minimum voltage level for $V_C$, namely $V_{LED}$, on line 390). Accordingly, the voltage regulator of the phase modulated AC/DC converter will have a variable set value for the capacitor C5 (345) voltage, based on Equations 4 and/or 5, given the degree of phase modulation.

When the capacitance of capacitor C5 (345) is comparatively large, as mentioned above, its energy is not depleted when the dimmer switch 75 is not providing power (i.e., during the β, non-Td intervals), and provides this second mode of operation, in which the LEDs 140 are effectively on continuously during these intervals. The resulting brightness is then regulated through the duty cycle of the PWM of the LED current provided through switching transistor 355 (Q2) under the control of the controller 260, such as through the incandescent emulation discussed above. This second mode may be utilized to provide a minimum light output during these intervals, and avoid any perceived flicker or unwanted color effects.

The proposed power stage 265 of the converter 100, 200 has the following features making it compatible with the phase modulated input voltage: (1) a relatively high input impedance (no input filter capacitor) in order to facilitate the design of the impedance matching circuit 120; (2) it allows very wide conversion ratios from input to output DC Voltages, avoiding overly-small duty cycles; (3) it uses a relatively small, low filtering capacitor for low frequency ripple, or can allow this ripple to be comparatively high (with filtering in the second stage 270), so smaller and/or a non-electrolytic capacitor may be used (such as a film or ceramic capacitor), decreasing costs and extending the life of the driver; (4) it has built-in capability to deliver power factor correction without additional power components; and (5) it has a small size, fewer components, comparatively lower cost, and high efficiency.

Additional advantages of the exemplary embodiments of the present invention are readily apparent. The exemplary embodiments allow for solid state lighting, such as LEDs, to be utilized with the currently existing lighting infrastructure and to be controlled by any of a variety of switches, such as phase modulating dimmer switches, which would otherwise cause significant operation problems. The exemplary embodiments further allow for sophisticated control of the output brightness or intensity of such solid state lighting, and may be implemented using fewer and comparatively lower cost components. In addition, the exemplary embodiments may be utilized for stand-alone solid state lighting systems, or may be utilized in parallel with other types of existing lighting systems, such as incandescent lamps.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

As used herein for purposes of the present invention, the term "LED" and its plural form "LEDs" should be understood to include any electroluminescent diode or other type of carrier injection- or junction-based system which is capable of generating radiation in response to an electrical signal, including without limitation, various semiconductor- or carbon-based structures which emit light in response to a current or voltage, light emitting polymers, organic LEDs, and so on, including within the visible spectrum, or other spectra such as ultraviolet or infrared, of any bandwidth, or of any color or color temperature.

A "controller" or "processor" 160, 260 may be any type of controller or processor, and may be embodied as one or more controllers 160, 260, adapted to perform the functionality discussed herein. As the term controller or processor is used herein, a controller 160, 260 may include use of a single integrated circuit ("IC"), or may include use of a plurality of integrated circuits or other components connected, arranged or grouped together, such as controllers, microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components. As a consequence, as used herein, the term controller (or processor) should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, FLASH, EPROM or $E^2$PROM. A controller (or processor) (such as controller 160, 260), with its associated memory, may be adapted or configured (via programming, FPGA interconnection, or hard-wiring) to perform the methodology of the invention, as discussed below. For example, the methodology may be programmed and stored, in a controller 160, 260 with its associated memory (and/or memory 155) and other equivalent components, as a set of program instructions or other code (or equivalent configuration or other program) for subsequent execution when the processor is operative (i.e., powered on and functioning). Equivalently, when the controller 160, 260 may implemented in whole or part as FPGAs, custom ICs and/or ASICs, the FPGAs, custom ICs or ASICs also may be designed, configured and/or hard-wired to implement the methodology of the invention. For example, the controller 160, 260 may be implemented as an arrangement of controllers, microprocessors, DSPs and/or ASICs, collectively referred to as a "controller", which are respectively programmed, designed, adapted or configured to implement the methodology of the invention, in conjunction with a memory 155.

The memory 155, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a controller 160, 260 or processor IC), whether volatile or non-volatile, whether removable or non-removable, including without limitation RAM, FLASH, DRAM, SDRAM, SRAM, MRAM, FeRAM, ROM, EPROM or $E^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. In addition, such computer readable media includes any form of communication media which embodies computer readable instructions, data structures, program modules or other data in a data signal or modulated signal, such as an electromagnetic or optical carrier wave or other transport mechanism, including any information delivery media, which may encode data or other information in a signal, wired or wirelessly, including electromagnetic, optical, acoustic, RF or infrared signals, and so on. The memory 155 may be adapted to store various look up tables, parameters, coefficients, other information and data, programs or instructions (of the software of the present invention), and other types of tables such as database tables.

As indicated above, the controller 160, 260 is programmed, using software and data structures of the invention, for example, to perform the methodology of the present invention. As a consequence, the system and method of the present invention may be embodied as software which provides such programming or other instructions, such as a set of instructions and/or metadata embodied within a computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the controller 160, 260, for example).

The software, metadata, or other source code of the present invention and any resulting bit file (object code, database, or look up table) may be embodied within any tangible storage medium, such as any of the computer or other machine-readable data storage media, as computer-readable instructions, data structures, program modules or other data, such as discussed above with respect to the memory 155, e.g., a floppy disk, a CDROM, a CD-RW, a DVD, a magnetic hard drive, an optical drive, or any other type of data storage apparatus or medium, as mentioned above.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A current regulator for providing variable power to solid state lighting, the current regulator couplable through a phase-modulating switch to an AC line voltage, the current regulator comprising:
    a rectifier;
    a switching power supply providing a first current; and
    an impedance matching circuit coupled to the switching power supply and couplable to the phase-modulating switch or to the AC line voltage, the impedance matching circuit to provide a second current through the phase-modulating switch when a magnitude of the first current is below a first predetermined threshold; wherein the impedance matching circuit comprises:
        a first resistor coupled to receive the first current from the) switching power supply and provide a first voltage level;
        a second resistor; and
        a current switch coupled in series to the second resistor, the switch responsive to a control voltage to modulate the second current through the second resistor in response to the first voltage level.

2. The current regulator of claim 1, wherein the current switch is a depletion mode field effect transistor which is conductive when the magnitude of the control voltage is below a second predetermined threshold.

3. The current regulator of claim 1, wherein the first resistor is a current sense resistor coupled in series with the switching power supply.

4. The current regulator of claim 1, further comprising:
    a controller coupled to the current switch, the controller to provide the control voltage.

5. The current regulator of claim 1, further comprising:
    a voltage limiter coupled in parallel to the first resistor.

6. The current regulator of claim 1, wherein the phase-modulating switch has a triac, and wherein the first predetermined threshold is at least a minimum holding current for the triac.

7. The current regulator of claim 1, further comprising:
    a controller couplable to the phase-modulating switch, the controller to determine a root-mean-square (RMS) voltage level provided by the phase-modulating switch from the AC line voltage.

8. The current regulator of claim 7, wherein the controller further is to compare the RMS voltage level to a nominal voltage level.

9. The current regulator of claim 8, wherein the controller further is to determine the nominal voltage level provided by the phase-modulating switch from the AC line voltage when a phase angle of a phase-modulated voltage level is about zero.

10. The current regulator of claim 8, wherein the controller further is to determine the nominal voltage level provided by the AC line voltage.

11. The current regulator of claim 8, wherein the controller further is to determine the nominal voltage level as a predetermined parameter stored in a memory.

12. The current regulator of claim 8, wherein the controller further is to determine the RMS voltage level by determining an amplitude and a phase angle of a phase-modulated voltage level provided by the phase-modulating switch from the AC line voltage.

13. The current regulator of claim 8, wherein the controller further is to determine a duty cycle for pulse-width current modulation by the switching power supply in response to the comparison of the RMS voltage level to the nominal voltage level.

14. The current regulator of claim 13, wherein the controller further is to determine the duty cycle based on a ratio of about a power of 3.4 of the provided RMS voltage level ($V_{RMS}$) to about a power of 3.4 of the nominal voltage level ($V_N$) ($V_{RMS}^{3.4}/V_N^{3.4}$).

15. The current regulator of claim 13, wherein the controller further is to determine the duty cycle "D" based on $$D \approx \frac{V_{RMS}^{3.4}}{V_{NOMINAL}^{3.4}},$$

in which $V_{RMS}$ is the provided RMS voltage level and $V_N$ is the nominal voltage level.

16. The current regulator of claim 1, wherein a capacitor of the switching power supply has a capacitance sufficient to provide energy to the solid state lighting when the phase-modulating switch is not providing power from the AC line voltage.

17. The current regulator of claim 1, wherein the switching power supply further comprises a first stage and a second stage, wherein the first stage is in an off-state when the phase-modulating switch is not providing power from the AC line voltage.

18. The current regulator of claim 1, wherein the switching power supply further comprises a first stage and a second stage, wherein the second stage is in an on-state when the phase-modulating switch is not providing power from the AC line voltage.

19. The current regulator of claim 18, wherein the second stage is to provide power to the solid state lighting when the phase-modulating switch is not providing power from the AC line voltage.

20. The current regulator of claim 1, further comprising:
a controller couplable to the phase-modulating switch and to the switching power supply, the controller to control a charging of a capacitor in the switching power supply to a first predetermined level during a first time interval.

21. The current regulator of claim 20, wherein the first time interval is when the phase-modulating switch is providing power from the AC line voltage.

22. The current regulator of claim 20, wherein the controller further is to determine the first predetermined level based upon a minimum voltage level of the solid state lighting and a voltage drop of the capacitor during a second time interval.

23. The current regulator of claim 22, wherein the second time interval is when the phase-modulating switch is not providing power from the AC line voltage.

24. The current regulator of claim 20, wherein the controller further is to determine the first predetermined level as voltage level "$V_C$" with $$V_C \approx V_{LED} + \frac{I_{ml} \cdot T \cdot V_{RMS}^{3.4}}{C \cdot V_{NOMINAL}^{3.4}},$$

where $I_{ml}$ is an amplitude of current through the solid state lighting, T is a half-cycle time of the AC line voltage, and C is the capacitance of the capacitor, $V_{RMS}$ is an RMS voltage level provided by the phase-modulating switch, and $V_N$ is a nominal voltage level of the AC line voltage.

25. The current regulator of claim 20, wherein the controller is further is to determine the first predetermined level voltage level as a function of the phase modulation performed by the phase-modulating switch.

26. The current regulator of claim 1, wherein the switching power supply further comprises:
an AC to DC converter; and
a buck converter.

27. The current regulator of claim 1, wherein the current regulator is coupled in parallel with an incandescent lamp.

28. A power converter for providing variable brightness levels for solid state lighting, the power converter couplable to a phase-modulating switch which is couplable to an AC line voltage, the power converter comprising:
a switching power supply providing a first current; and
an active impedance matching circuit coupled to the switching power supply, the active impedance matching circuit to provide a variable, second current in response to a magnitude of the first current; wherein the active impedance matching circuit comprises:
a first resistor coupled to receive the first current from the switching power supply and provide a first voltage level;
a second resistor; and
a transistor coupled in series to the second resistor, the transistor responsive to a control voltage to modulate the second, variable current through the second resistor in response to the first voltage level.

29. The power converter of claim 28, wherein the active impedance matching circuit is to provide the variable, second current when the magnitude of the first current is below a first predetermined threshold.

30. The power converter of claim 29, wherein phase-modulating switch has a triac, and wherein the first predetermined threshold is at least a minimum holding current for the triac.

31. The power converter of claim 28, wherein the transistor is a depletion mode field effect transistor which is conductive when the control voltage is above a second predetermined threshold.

32. The power converter of claim 28, further comprising:
a controller coupled to the transistor, the controller to provide the control voltage.

33. The power converter of claim 28, further comprising:
a controller couplable to the phase-modulating switch, the controller to determine a root-mean-square (RMS) voltage level provided by the phase-modulating switch from the AC line voltage.

34. The power converter of claim 33, wherein the controller further is to compare the RMS voltage level to a nominal voltage level.

35. The power converter of claim 34, wherein the controller further is to determine a duty cycle for pulse-width current modulation by the switching power supply in response to the comparison of the RMS voltage level to the nominal voltage level.

36. The power converter of claim 35, wherein the controller further is to determine the duty cycle based on a ratio of about a power of 3.4 of the RMS voltage level ($V_{RMS}$) to about a power of 3.4 of the nominal voltage level ($V_N$)($V_{RMS}^{3.4}$/$V_N^{3.4}$).

37. The power converter of claim 35, wherein the controller further is to determine the duty cycle "D" based on $$D \approx \frac{V_{RMS}^{3.4}}{V_{NOMINAL}^{3.4}},$$

in which $V_{RMS}$ is the RMS voltage level and $V_N$ is the nominal voltage level.

38. The power converter of claim 33, wherein the controller further is to determine the nominal voltage level provided by the phase-modulating switch from the AC line voltage when a phase angle of a phase-modulated voltage level is about zero.

39. The power converter of claim 33, wherein the controller further is to determine the nominal voltage level as a predetermined parameter stored in a memory.

40. The power converter of claim 33, wherein the controller further is to determine the nominal voltage level provided by the AC line voltage.

41. The power converter of claim 33, wherein the controller further is to determine the RMS voltage level by determining an amplitude and a phase angle of a phase-modulated voltage level provided by the phase-modulating switch from the AC line voltage.

42. The power converter of claim 28, wherein the switching power supply has at least two stages.

43. The power converter of claim 28, wherein a capacitor of the switching power supply has a capacitance sufficient to provide energy to the solid state lighting when the phase-modulating switch is not providing power from the AC line voltage.

44. The power converter of claim 28, wherein the switching power supply further comprises a first stage and a second stage, wherein the first stage is in an off-state when the phase-modulating switch is not providing power from the AC line voltage.

45. The power converter of claim 28, wherein the switching power supply further comprises a first stage and a second stage, wherein the second stage is in an on-state when the phase-modulating switch is not providing power from the AC line voltage.

46. The power converter of claim 45, wherein the second stage is to provide power to the solid state lighting when the phase-modulating switch is not providing power from the AC line voltage.

47. The power converter of claim 28, further comprising:
a controller couplable to the phase-modulating switch and to the switching power supply, the controller to control a charging of a capacitor in the switching power supply to a first predetermined level during a first time interval.

48. The power converter of claim 47, wherein the first time interval is when the phase-modulating switch is providing power from the AC line voltage.

49. The power converter of claim 47, wherein the controller further is to determine the first predetermined level based upon a minimum voltage level of the solid state lighting and a voltage drop of the capacitor during a second time interval.

50. The power converter of claim 49, wherein the second time interval is when the phase-modulating switch is not providing power from the AC line voltage.

51. The power converter of claim 47, wherein the controller further is to determine the first predetermined level as voltage level "$V_C$" with $$V_C \approx V_{LED} + \frac{I_{ml} \cdot T \cdot V_{RMS}^{3.4}}{C \cdot V_{NOMINAL}^{3.4}},$$

where $I_{ml}$ is an amplitude of current through the solid state lighting, T is a half-cycle time of the AC line voltage, and C is the capacitance of the capacitor, $V_{RMS}$ is an RMS voltage level provided by the phase-modulating switch, and $V_N$ is a nominal voltage level of the AC line voltage.

52. The power converter of claim 47, wherein the controller further is to determine the first predetermined level voltage level as a function of the phase modulation performed by the phase-modulating switch.

53. The power converter of claim 28, wherein the switching power supply further comprises:
an AC to DC converter; and
a buck converter.

54. A current regulator for providing variable brightness levels for solid state lighting, the current regulator couplable to a phase-modulating switch coupled to an AC line voltage, the current regulator comprising:
a rectifier;
a switching power supply providing a first current;
an impedance matching circuit coupled to the switching power supply and couplable to the phase-modulating switch or to the AC line voltage, the impedance matching circuit to provide a second current through the phase-modulating switch when a magnitude of the first current is below a first predetermined threshold; and
a controller coupled to the switching power supply and couplable to the phase-modulating switch, the controller to determine a root-mean-square (RMS) voltage level provided by the phase-modulating switch from the AC line voltage and to determine a duty cycle for pulse-width current modulation by the switching power supply in response to the comparison of the RMS voltage level to a nominal voltage level.

55. The current regulator of claim 54, wherein the impedance matching circuit comprises:
a first resistor coupled to receive the first current from the switching power supply and provide a first voltage level;
a second resistor; and
a current switch coupled in series to the second resistor, the switch responsive to a control voltage to modulate the second current through the second resistor in response to the first voltage level.

56. The current regulator of claim 54, wherein phase-modulating switch has a triac, and wherein the first predetermined threshold is at least a minimum holding current for the triac.

57. The current regulator of claim 54, wherein the controller further is to determine the duty cycle based on a ratio of about a power of 3.4 of the RMS voltage level ($V_{RMS}$) to about a power of 3.4 of the nominal voltage level ($V_N$)($V_{RMS}^{3.4}$/$V_N^{3.4}$).

58. The current regulator of claim 54, wherein the controller further is to determine the duty cycle "D" based on $$D \approx \frac{V_{RMS}^{3.4}}{V_{NOMINAL}^{3.4}},$$

in which $V_{RMS}$ is the RMS voltage level and $V_N$ is the nominal voltage level.

59. The current regulator of claim 54, wherein the controller further is to determine the nominal voltage level provided by the phase-modulating switch from the AC line voltage when a phase angle of a phase-modulated voltage level is about zero.

60. The current regulator of claim 54, wherein the controller further is to determine the nominal voltage level as a predetermined parameter stored in a memory.

61. The power converter of claim 54, wherein the controller further is to determine the nominal voltage level provided by the AC line voltage.

62. The current regulator of claim 54, wherein the controller further is to determine the RMS voltage level by determining an amplitude and a phase angle of a phase-modulated voltage level provided by the phase-modulating switch from the AC line voltage.

63. The current regulator of claim 54, wherein a capacitor of the switching power supply has a capacitance sufficient to provide energy to the solid state lighting when the phase-modulating switch is not providing power from the AC line voltage.

64. The current regulator of claim 54, wherein the switching power supply further comprises a first stage and a second stage, wherein the first stage is in an off-state when the phase-modulating switch is not providing power from the AC line voltage.

65. The current regulator of claim 54, wherein the switching power supply further comprises a first stage and a second stage, wherein the second stage is in an on-state when the phase-modulating switch is not providing power from the AC line voltage.

66. The current regulator of claim 65, wherein the second stage is to provide power to the solid state lighting when the phase-modulating switch is not providing power from the AC line voltage.

67. The current regulator of claim 54, wherein the controller further is to control a charging of a capacitor in the switching power supply to a first predetermined level during a first time interval.

68. The current regulator of claim 67, wherein the first time interval is when the phase-modulating switch is providing power from the AC line voltage.

69. The current regulator of claim 67, wherein the controller further is to determine the first predetermined level based upon a minimum voltage level of the solid state lighting and a voltage drop of the capacitor during a second time interval.

70. The current regulator of claim 69, wherein the second time interval is when the phase-modulating switch is not providing power from the AC line voltage.

71. The current regulator of claim 67, wherein the controller further is to determine the first predetermined level as voltage level "$V_C$" with $$V_C \approx V_{LED} + \frac{I_{ml} \cdot T \cdot V_{RMS}^{3.4}}{C \cdot V_{NOMINAL}^{3.4}},$$

where $I_{ml}$ is an amplitude of current through the solid state lighting, T is a half-cycle time of the AC line voltage, and C is the capacitance of the capacitor, $V_{RMS}$ is an RMS voltage level provided by the phase-modulating switch, and $V_N$ is a nominal voltage level of the AC line voltage.

72. The current regulator of claim 67, wherein the controller further is to determine the first predetermined level voltage level as a function of the phase modulation performed by the phase-modulating switch.

73. A current regulator for providing variable brightness levels for a plurality of light emitting diodes, the current regulator couplable to a phase-modulating switch coupled to an AC line voltage, the current regulator comprising:
   a switching power supply providing a first current; and
   a controller coupled to the switching power supply and couplable to the phase-modulating switch, the controller to provide power to the plurality of light emitting diodes when the phase-modulating switch is not providing power from the AC line voltage; and
   an impedance matching circuit comprising:
      a first resistor coupled to receive the first current from the switching power supply and provide a first voltage level;
      a second resistor; and
      a current switch coupled in series to the second resistor, the switch responsive to a control voltage to modulate the second current through the second resistor in response to the first voltage level.

74. The current regulator of claim 73, wherein the controller further is to control a charging of a capacitor in the switching power supply to a first predetermined level during a first time interval.

75. The current regulator of claim 74, wherein the first time interval is when the phase-modulating switch is providing power from the AC line voltage.

76. The current regulator of claim 74, wherein the controller further is to determine the first predetermined level based upon a minimum voltage level of the plurality of light emitting diodes and a voltage drop of the capacitor during a second time interval.

77. The current regulator of claim 76, wherein the second time interval is when the phase-modulating switch is not providing power from the AC line voltage.

78. The current regulator of claim 74, wherein the controller further is to determine the first predetermined level as voltage level "$V_C$" with $$V_C \approx V_{LED} + \frac{I_{ml} \cdot T \cdot V_{RMS}^{3.4}}{C \cdot V_{NOMINAL}^{3.4}},$$

where $I_{ml}$ is an amplitude of current through the solid state lighting, T is a half-cycle time of the AC line voltage, and C is the capacitance of the capacitor, $V_{RMS}$ is an RMS voltage level provided by the phase-modulating switch, and $V_N$ is a nominal voltage level of the AC line voltage.

79. The current regulator of claim 74, wherein the controller further is to determine the first predetermined level voltage level as a function of the phase modulation performed by the phase-modulating switch.

* * * * *